US009338021B2

(12) United States Patent
Sarin et al.

(10) Patent No.: US 9,338,021 B2
(45) Date of Patent: May 10, 2016

(54) NETWORK TRAFFIC REDIRECTION IN BI-PLANAR NETWORKS

(75) Inventors: Alexander Sarin, Freehold, NJ (US); Hazem Kabbara, Boylston, MA (US); Chin Yaw Tiew, Westford, MA (US)

(73) Assignee: Trend Micro Incorporated, Tokyo (JP)

( * ) Notice: Subject to any disclaimer, the term of this patent is extended or adjusted under 35 U.S.C. 154(b) by 2138 days.

(21) Appl. No.: 11/643,553

(22) Filed: Dec. 21, 2006

(65) Prior Publication Data

US 2008/0151754 A1 Jun. 26, 2008

(51) Int. Cl.
*H04L 12/24* (2006.01)
*H04L 12/26* (2006.01)

(52) U.S. Cl.
CPC ............... *H04L 12/24* (2013.01); *H04L 41/00* (2013.01); *H04L 41/0213* (2013.01); *H04L 41/046* (2013.01); *H04L 41/0893* (2013.01); *H04L 43/028* (2013.01)

(58) Field of Classification Search
CPC ..... H04L 12/24; H04L 41/00; H04L 41/0893; H04L 41/046; H04L 43/028; H04L 41/0213
USPC .......................................... 370/235, 229, 230
See application file for complete search history.

(56) References Cited

U.S. PATENT DOCUMENTS

| | | | | |
|---|---|---|---|---|
| 6,006,264 A | | 12/1999 | Colby et al. .................. 709/226 |
| 6,321,336 B1* | | 11/2001 | Applegate et al. .............. 726/11 |
| 6,601,186 B1* | | 7/2003 | Fox et al. .......................... 714/4 |
| 7,113,581 B2* | | 9/2006 | Benedyk et al. .............. 379/219 |
| 7,450,940 B2* | | 11/2008 | Myers et al. ................ 455/432.1 |
| 2004/0156355 A1* | | 8/2004 | Stumpert ....................... 370/352 |
| 2006/0172742 A1* | | 8/2006 | Chou et al. .................... 455/450 |
| 2007/0127491 A1* | | 6/2007 | Verzijp et al. .............. 370/395.2 |
| 2007/0245011 A1* | | 10/2007 | Kouhsari et al. .............. 709/223 |

FOREIGN PATENT DOCUMENTS

CN 1852121 A 10/2006

OTHER PUBLICATIONS

"Signaling System 7 (SS7)," Web ProForum Tutorials, available at http://www.iec.org.online/tutorials/acrobat/ss7.pdf.
Cummings, J., "The New Network Switch," Network World, Feb. 6, 2006, available at http://www.networkworld.com/research/2006/020606-network-switch.html.
"Deploying Control Plane Policing," Cisco Systems, White Paper, May 2005, available at http://cisco.com/en/US/products/ps6642/products_white-paper0900aecd804fa16a.shtml.
"Securing Service Provider Networks," Laurel Networks, Technology Overview, available at http://www.web.archive.org/web/20050518094952/www.laurelnetworks.com/products/literature/security.pdf.

(Continued)

*Primary Examiner* — Mohammad Anwar
(74) *Attorney, Agent, or Firm* — Okamoto & Benedicto LLP

(57) ABSTRACT

An electronic communication network includes a connectivity subsystem. The connectivity subsystem registers a control subsystem with the connectivity subsystem. The control subsystem requests that network traffic be redirected from the connectivity subsystem to the control subsystem. In response to the request, the connectivity subsystem redirects network traffic from the connectivity subsystem to the control subsystem.

64 Claims, 10 Drawing Sheets

(56) References Cited

OTHER PUBLICATIONS

Hochmuth, P., "3Com CTO Spells Out Strategy," Network World, Dec. 8, 2005, available at http://www.networkworld.com/cgi-bin/mailto/x/cgi.

Maltz, D.A., et al., "Rethinking the Systems for Network Control," ATT Labs Research Slide Presentation, Dec. 2004, available at http://100x100network.org/presentations/Maltz-rethinking-network-control.ppt.

Campanella, M., "Control Plane Ideas," GARR, LightPath Workshop Slide Presentation, Mar. 25, 2004, available at http://www.canarie.ca/canet4/library/lightpath_workshop/presentations/campanella.pdf.

"Bi-Planar Networks," TippingPoint Technologies, Publication No. 400972-002, Feb. 2006.

Doria (Co Editor) Forces Protocol Design Team A: Forces Protocol Specification; draft-doria-forces-protocol-01.txt, 20040601, No. 1, Jun. 1, 2004, XP015012527.

Extended European Search Report received in EP Application No. 07254877.9, mailed Aug. 29, 2012, p. 9.

Quittek, J; "Using SNMP as Midcom Protocol"; draft-quittek-midcom-snmp-eval-00.txt; Nov. 1, 2001.

Srisuresh, P; SNMP Managed objects for Middlebox Communications (MIDCOM); draft-srisuresh-midcom-mib-01.txt; Oct. 1, 2003.

Stiemerling, M et al; "Middlebox configuration protocol design"; IP Operations and Management, 2002 IEEE Workshop on Oct. 29-31, 2002, Piscataway, NJ, USA.

Yang Intel Corp R Dantu Uiv of North Texas T Anderson Intel Corp R Gopal Nokia L: Forwarding and Control Element Separation (ForCES) Framework; draft-iet-forces-framework-13.txt, 20040101, vol. forces, No. 13, Jan. 1, 2004 XP015018466.

\* cited by examiner

NETWORK TRAFFIC REDIRECTION IN BI-PLANAR NETWORKS

CROSS REFERENCE TO RELATED APPLICATIONS

This application is related to the following U.S. patent applications, all of which are incorporated by reference herein: U.S. patent application Ser. No. 11/121,192, filed on May 3, 2005, entitled, "Packet diversion"; U.S. patent application Ser. No. 11/443,490, filed on May 30, 2006, entitled "Intrusion Prevention System Edge Controller"; U.S. patent application Ser. No. 11/636,240, filed on Dec. 8, 2006, entitled "Bi-Planar Network Architecture."

BACKGROUND

Electronic communication networks based on the Internet Protocol (IP) have become ubiquitous. Although the primary focus of the information technology (IT) industry over the last two decades has been to achieve "anytime, anywhere" IP network connectivity, that problem has, to a large extent, been solved. Individuals can now use a wide variety of devices connected to a combination of public and private networks to communicate with each other and use applications within and between private enterprises, government agencies, public spaces (such as coffee shops and airports), and even private residences. A corporate executive can now reliably send an email message wirelessly using a handheld device at a restaurant to a schoolteacher using a desktop computer connected to the Internet by a wired telephone line halfway around the world.

In other words, virtually any IP-enabled device today can communicate with any other IP-enabled device at any time. Advances in the resiliency, reliability, and speed of IP connections have been made possible by improvements to the traditional routers and switches that form the "connectivity plane" of IP networks. Such "IP connectivity" networks have propelled business productivity enormously the world over.

Because the problem of IP connectivity has largely been solved, the enterprise network industry now faces an important inflection point. Some IP networks today include not only switches and routers, but also a host of point solution appliances (sometimes called "bumps in the wire") which have been added to the network over time in attempts to perform functions that the switches and routers themselves were not responsible for performing. In other cases, these additional functions have been "bolted on" to the switches and routers themselves. These additional control functions, whether installed as separate appliances or as "bolt-ons," have been used, for example, to act as network access firewalls, to perform intrusion detection and prevention, and to enforce policy-based application bandwidth control. Although these control functions often work relatively well for their individual intended purposes, their introduction (whether in the form of point solution appliances or bolt-ons to switches and routers) has led to high-cost, difficult-to-manage network environments.

The problems addressed, however inadequately, by such added control functions are only growing in scope and complexity. One of the greatest strengths of IP networks—their openness—is now exposing enterprise networks to constant infrastructure and information security threats. These threats can lead to catastrophic business downtime and even legal liability for invasion of privacy.

Furthermore, although IP networks originally only carried data traffic, such networks are increasingly relied upon also to carry traffic for mission-critical business applications, voice, and video. Each of these kinds of traffic has its own performance requirements. Combining these multiple kinds of traffic into a single IP network is leading to application performance issues that the connectivity plane (e.g., switches and routers) was not designed to address. For example, conventional connectivity networks were not designed to provide the quality of service (QoS), authentication, encryption, and threat management needed for these new business-critical functions. As an example, conventional connectivity networks typically lack the ability to maintain the high QoS required by voice traffic in the face of bursts of data traffic on the same network.

Furthermore, the cost of network downtime has skyrocketed. When businesses relied on their IP networks only for data traffic, and when such data traffic was required for only a small portion of the business' activities, the cost of having an email server down for an hour was relatively low. Now that voice, data, video, application and other traffic are combined onto the same network, and now that an increasingly large percentage of business functions rely on such traffic, the cost of network downtime is significantly higher. In essence, when the network stops, the business stops, leading to lost productivity, lost revenue, and customer dissatisfaction.

Enterprise executives understand this reality. From a technical perspective, CIOs know that the current connectivity network cannot resolve security and application performance issues. In turn, from a financial perspective, CFOs are concerned that it will be too expensive to solve these problems by performing a "forklift upgrade"—replacing the entire connectivity plane with new hardware. Finally, from an overall business perspective, CEOs cannot tolerate network security downtime risk, and are demanding predictable, stable application performance.

Consider some of the problems of conventional connectivity networks in more detail. A bare IP network typically does not perform any kind of "access control"—controlling which users and devices can access the network. In general, access control policies define which traffic is allowed onto the network based on the identity of the user and/or device transmitting the traffic. One solution to this problem has been to use firewalls to establish a network "perimeter" defining which users and devices are "inside"—and therefore authorized to access the network—and which users and devices are "outside"—and therefore prohibited from accessing the network. The concept of a clear network perimeter made sense when all users accessed the network from fixed devices (such as desktop computers) that were physically located within and wired to the network. Now, however, users access the network from a variety of devices—including laptops, cell phones, and PDAs—using both wired and wireless connections, and from a variety of locations inside and outside the physical plant of the enterprise. As a result, the perimeter has blurred, thereby limiting the utility of firewalls and other systems which are premised on a clear inside-outside distinction.

A bare IP network also does not perform any kind of "attack control"—protecting the network against viruses, worms, and other malicious network activity. In general, attack control policies define criteria for identifying traffic as malicious, and the actions to be applied to such malicious traffic (such as excluding it from the network). Today's networks are constantly under attack, both by directed and non-directed attacks. Furthermore, the attacks continually evolve, often making yesterday's defenses obsolete. Moreover, network vulnerabilities often are discovered and exploited more quickly today than in the past, as a result of increased availability of turnkey attack tools that automatically search for and attack weak points in the network.

The typical cost of a successful attack is higher today than in the past because of the increased value of information stored on modern networks. The same use of the network to connect a larger number and wider variety of devices that leads to problems for traditional access control mechanisms has also spurred the use of the network to store increasingly high-value information. Anyone who has attempted to store copies of the same data on a desktop computer, laptop computer, PDA, and cell phone, and to synchronize that data across all of the devices, knows that storing data at the edge of the network can be inefficient. This has led to a movement of data back toward a centralized depository. Although such centralization can lead to increased efficiency, it also serves as a tempting lure for high-value attacks on the network.

Furthermore, a bare IP network does not perform any kind of "application control.". In general, application control policies define how traffic within the network is handled, based on the application transmitting the traffic. Traditional routers and switches route packets without any knowledge of the applications transmitting or receiving those packets. Application control is critical, however, in the context of modern IP networks in which applications are consolidated into a single IP infrastructure, and in which mission-critical data applications and non-critical applications compete with each other for network bandwidth.

For example, the telephone network traditionally has been a physically separate network from the data network. As the telephone network converges with the data network, businesses gain tremendous advantages in both cost and the ability to deploy new voice services. But they do so at the risk of exposing telephony, an application of extremely high availability expectation, to the perils of the IP environment. As mentioned above, the result is that voice-over-IP (VoIP) tends to work well in a lightly-loaded customer network—until traffic surges or the network comes under attack. The challenge is to imbue telephony with the benefits of IP networks without sacrificing quality of service.

Unproductive network traffic has also increased due to the emergence of bandwidth-consuming peer-to-peer applications, such as BitTorrent, Kazaa, and Gnutella. Furthermore, as new devices connect to the network, bandwidth increases accordingly, as well as the probability of a malfunctioning device flooding the network with garbage traffic. Conventional connectivity networks, which do not distinguish between packets delivered by or transmitted to different applications, are unequipped to address these problems.

SUMMARY

The above-reference patent application entitled, "Bi-Planar Network Architecture," discloses electronic communications networks including a connectivity plane for performing network connectivity functions, and a control plane for performing one or more of network access control, attack control, and application control. Such a connectivity plane and control plane may interconnect and interact with each other through a variety of interfaces. Embodiments of the present invention are directed to techniques for providing interfaces between a connectivity plane and a control plane in an electronic communication network. In particular, according to embodiments of the present invention the control plane is registered with the connectivity plane, and the connectivity plane redirects network traffic from the connectivity plane to the control plane.

For example, in one embodiment of the present invention, an electronic communication network includes a connectivity subsystem. A control subsystem is registered with the connectivity subsystem. The control subsystem requests that traffic be redirected from the connectivity subsystem to the control subsystem. In response to the redirection request, the connectivity subsystem redirects network traffic to the control subsystem. Information about the connectivity subsystem, the control subsystem, and the redirection request may be stored in a record such as a management information base. The connectivity subsystem and control subsystem may communicate with each other using a protocol, such as SNMP or a protocol layered on top of SNMP.

In another embodiment of the present invention, an electronic communication network includes a connectivity subsystem and a control subsystem. The connectivity subsystem includes means for receiving a registration request from the control subsystem, means for confirming the registration, means for receiving a redirection request from the control subsystem, and means for confirming the redirection request.

In yet another embodiment of the present invention, a connectivity system is provided for use with an electronic communication network. The electronic communication network includes a control subsystem. The connectivity subsystem includes means for receiving a registration request from the control subsystem to register the control subsystem with the connectivity subsystem; means for registering the control subsystem with the connectivity subsystem in response to the registration request; means for receiving a redirection request from the control subsystem to redirect network traffic from the connectivity subsystem to the control subsystem; and means for redirecting the network traffic to the control subsystem in response to the redirection request.

In a further embodiment of the present invention, a control subsystem is provided for use with an electronic communication network. The electronic communication network includes a connectivity subsystem. The control subsystem includes registration request means for requesting that the control subsystem be registered with the connectivity subsystem; and redirection request means for requesting that network traffic be redirected from the connectivity subsystem to the control subsystem.

In yet a further embodiment of the present invention, a device includes a computer-readable medium. The computer-readable medium tangibly embodies computer program code including registration code specifying a control subsystem registered with a connectivity subsystem in an electronic communication network; and redirection code including instructions for redirecting network traffic from the connectivity subsystem to the control subsystem. The device also includes redirection criteria means, interoperable with the registration code and the redirection code, for determining which network traffic to redirect to the control subsystem.

In still a further embodiment of the present invention, an interface is provided between a connectivity subsystem and a control subsystem in an electronic communication network. The interface includes means for carrying a registration request from the control subsystem to the connectivity subsystem; means for carrying a traffic redirection request from the control subsystem to the connectivity subsystem; and means for carrying redirected traffic from the connectivity subsystem to the control subsystem.

Other features and advantages of various aspects and embodiments of the present invention will become apparent from the following description and from the claims.

DETAILED DESCRIPTION

Figure 1:
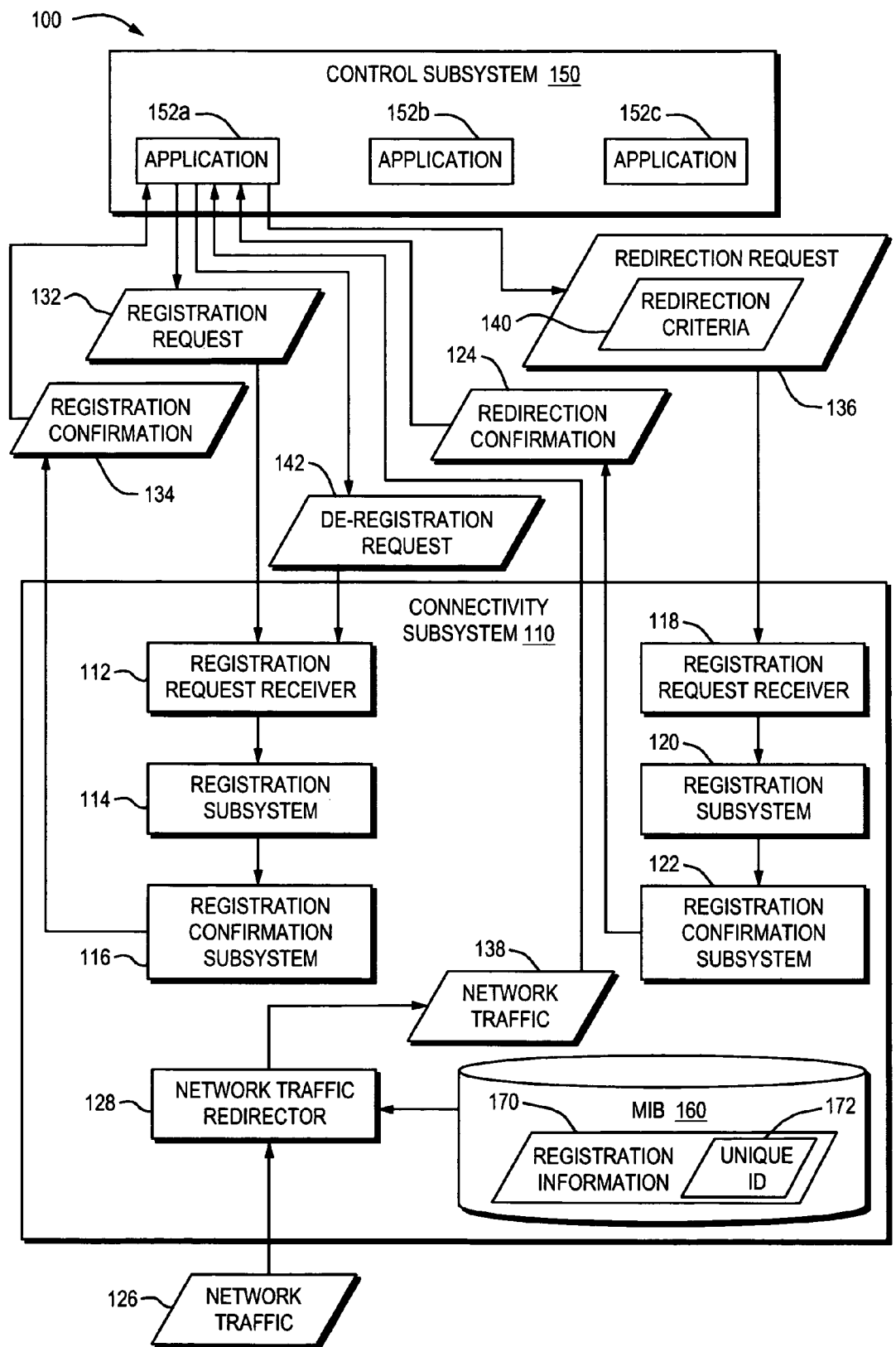
FIG. 1 is a diagram of an electronic communication network according to one embodiment of the present invention.

Referring to FIG. 1, a diagram is shown of an electronic communication network 100 according to one embodiment of the present invention. The network 100 includes a connectivity subsystem 110 and a control subsystem 150. The connectivity subsystem 110 may, for example, be implemented as one of a plurality of connectivity subsystems in a "connectivity plane," as that term is used in the above-referenced patent application entitled, "Bi-Planar Network Architecture." For example, the connectivity subsystem 110 may be implemented as a switch or a router. Similarly, the control subsystem 150 may, for example, be implemented as one of a plurality of control subsystems in a "control plane," as that term is used in the above-referenced patent application entitled, "Bi-Planar Network Architecture."

In general, the control subsystem 150 registers itself with the connectivity subsystem 110 and requests that network traffic be redirected to the control subsystem 150. More specifically, the connectivity subsystem 110 includes means 112 for receiving a registration request 132 from the control subsystem 150, means 114 for registering the control subsystem 150 with the connectivity subsystem 110 in response to the registration request 132, means 116 for confirming the registration, means 118 for receiving a redirection request 136 from the control subsystem 150, means 128 for redirecting network traffic 126 to the control subsystem 150 in response to the redirection request 136, and means 122 for confirming the redirection request 136.

Figure 2A:
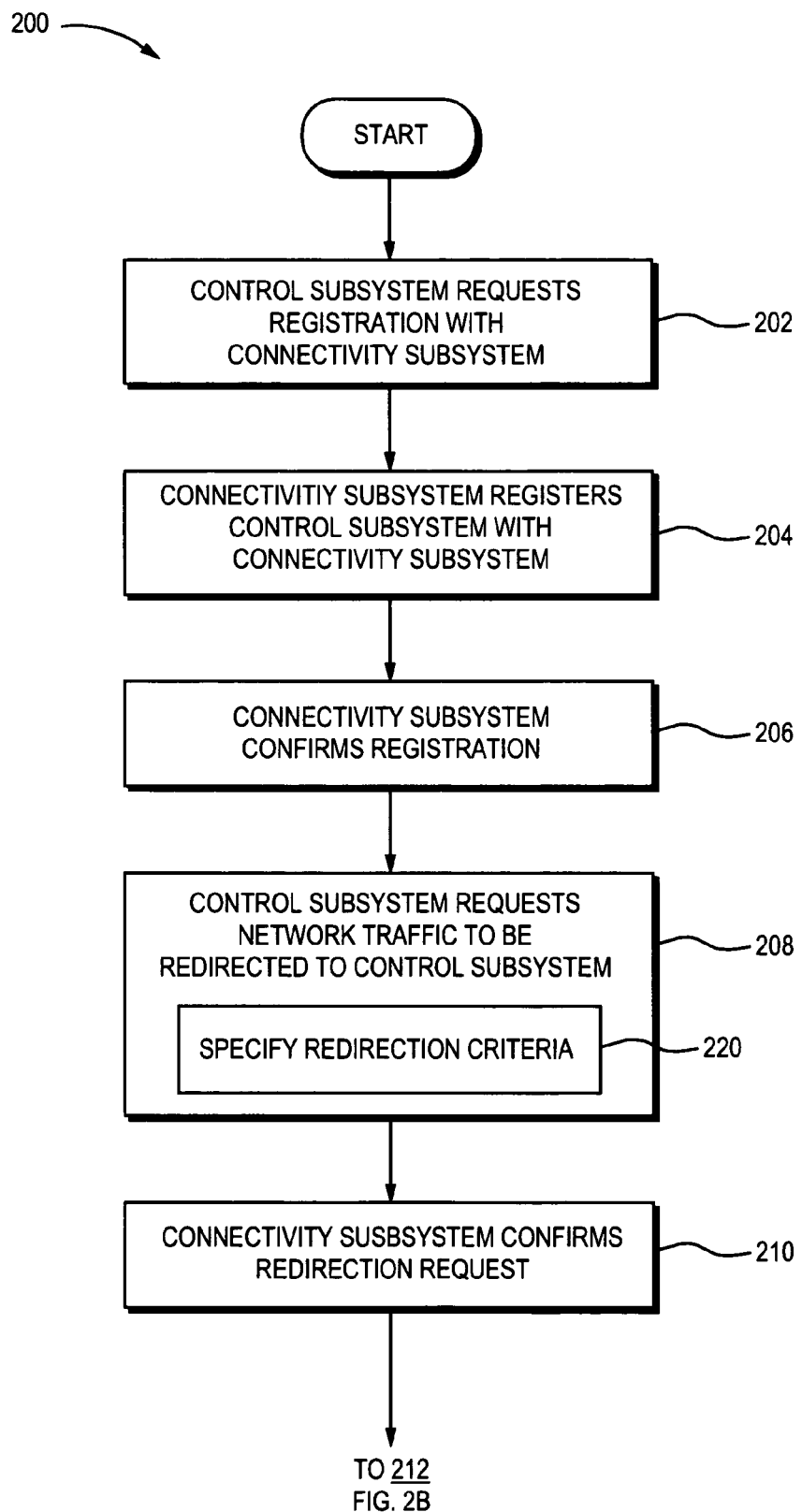
FIGS. 2A-2B are a flowchart of a method for redirecting network traffic to a control subsystem in the electronic communication network of FIG. 1 according to one embodiment of the present invention.
Figure 2B:
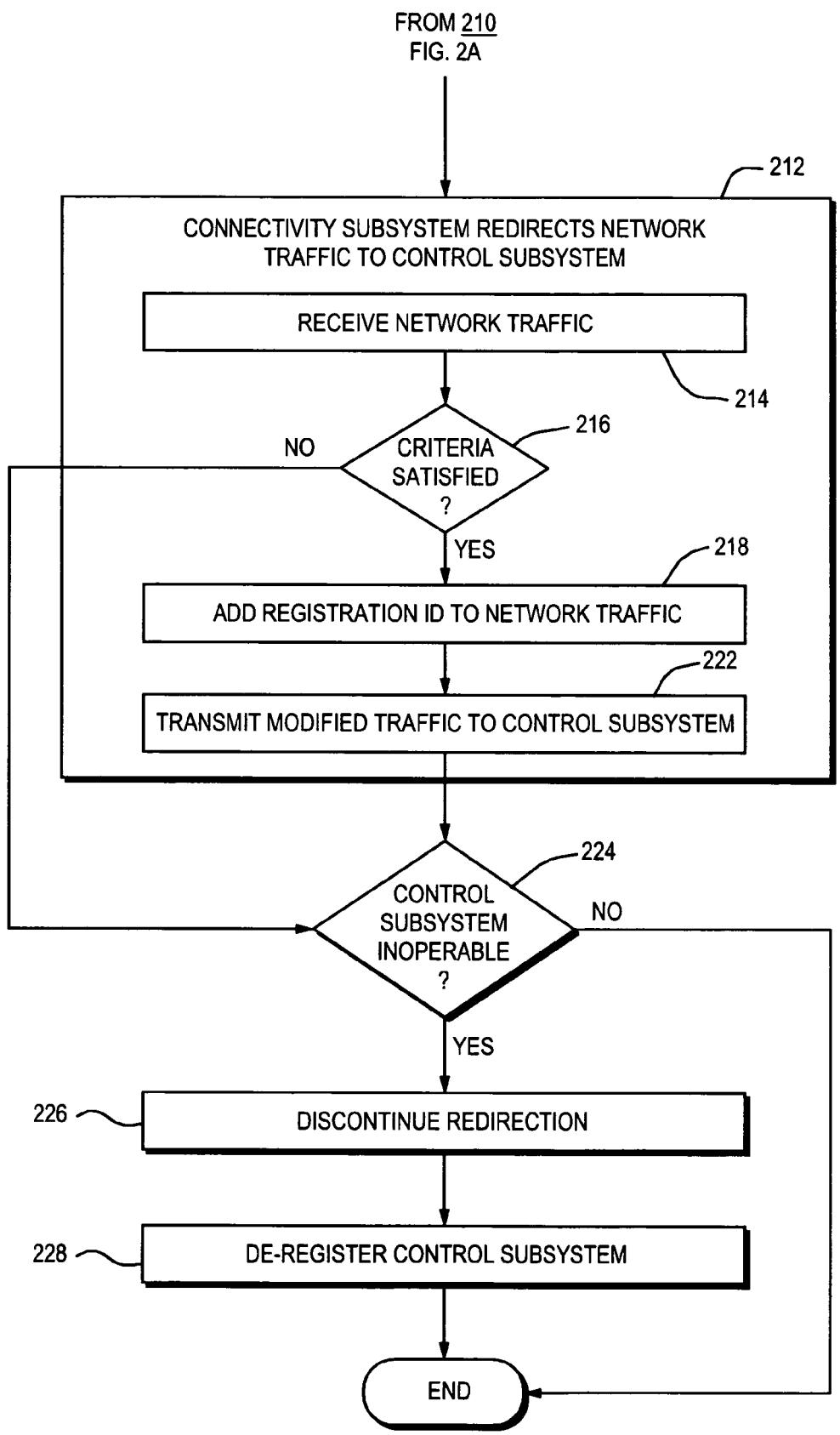

Referring to FIGS. 2A-2B, a flowchart is shown of a method 200 for use with the electronic communication network 100 of FIG. 1 according to one embodiment of the present invention. The control subsystem 150 includes applications 152a-c executing on the control subsystem 150. The applications 152a-c may, for example, provide network control functions, such as access control, attack control, and application control. Although three applications 152a-c are shown in FIG. 1 for purposes of example, there may be any number of applications.

The control subsystem 150 requests that it be registered with the connectivity subsystem 110 (step 202), such as by transmitting the registration request 132 to the connectivity subsystem 110. More specifically, one of the applications 152a-c executing on the control subsystem 150 may transmit the request 132 to register itself with the connectivity subsystem 110. Assume for purposes of the following discussion that application 152a transmits the request 132. More generally, although the following discussion may refer to the control subsystem 150 as communicating with the connectivity subsystem 110, such communications may be performed by any one of the applications 152a-c.

The registration request 132 may, for example, be transmitted by the control subsystem 150 in response to the control subsystem 150 being deployed in the system 100. The control subsystem 150 may be required to authenticate itself with the connectivity subsystem 110 before submitting the registration request 132.

In response to the registration request 132, the connectivity subsystem 110 registers the control subsystem 150 with the connectivity subsystem 110 (step 204). As part of the registration, the connectivity subsystem 110 may, for example, store registration information 170 descriptive of the control subsystem 150 in the connectivity subsystem 110. For example, the connectivity subsystem 110 may generate and store, in the registration information 170, a unique identifier 172 for the control subsystem 150.

The connectivity subsystem 110 confirms that the control subsystem 150 has been registered with the connectivity subsystem 110 (step 206). The connectivity subsystem 110 may perform the confirmation by, for example, transmitting the confirmation message 134 (such as an acknowledgement of an SNMP "set") to the control subsystem 150. Alternatively, for example, the control subsystem 150 may confirm the registration by attempting to read back the registration information 170 from the connectivity subsystem 110, and by considering the registration to be confirmed if the information is read back successfully.

As part of the confirmation, the connectivity subsystem 110 may transmit to the control subsystem 150 information about capabilities of the connectivity subsystem 110. Such information may, for example, be included in the registration confirmation message 134. The information may indicate, for example, which redirection modes the connectivity subsystem 110 supports (e.g., IP address mode, copy and forward mode, redirect mode); whether the connectivity subsystem 110 supports "deny" mode (in which filtered packets are discarded without being redirected); whether the connectivity subsystem 110 supports "allow" mode (in which all packets are forwarded without applying filtering rules to them); which classification fields the connectivity subsystem 110 supports (e.g., physical port, MAC address, protocol (e.g., IP, IPX), IP header fields and wildcards, TCP/UDP ports and ranges, traffic rate, date/time, combination of different fields); whether the connectivity subsystem 110 supports IPv4, IPv6, or both; and the total number of traffic filtering rules that can be configured in the connectivity subsystem 110.

The control subsystem 150 requests that network traffic 126 be redirected from the connectivity subsystem 110 to the control subsystem 150, such as by transmitting the redirection request 136 to the connectivity subsystem 110 (step 208). The connectivity subsystem 110 confirms the network traffic redirection request 136 (step 210). The connectivity subsystem 110 may perform the confirmation by, for example, transmitting the redirection confirmation message 124 to the control subsystem 150. Alternatively, for example, the control subsystem 150 may confirm the redirection by attempting to read back direction information (such as the redirection criteria 140) from the connectivity subsystem 110, and by considering the redirection to be confirmed if the information is read back successfully.

The redirection request 136 may include redirection criteria 140 for determining which traffic to redirect to the control subsystem 150. The redirection criteria 140 may be defined in any of a variety of ways. For example, the redirection criteria 140 may include one or more rules. Each such rule may, for example, specify any one or more of the following criteria: physical port number (or range of physical port numbers), MAC address, VLAN, protocol, IP header source address (or wildcard), IP header destination address (or wildcard), TCP port (or range of TCP ports), UDP port (or range of UDP ports), traffic rate, and date/time (beginning, end, or range) when the rule should be applied. The redirection criteria 140 may include any number of rules.

Each rule in the redirection criteria 140 may specify an action to be taken for traffic that satisfies the rule. Such actions may include, for example: forwarding the traffic in IP address mode; forwarding the traffic in redirect mode; forwarding the traffic in copy and forward mode; allow mode; deny mode; and rate mode. A record of the redirection criteria 140 may be stored in the registration information 170 associated with the control subsystem 150, so that the connectivity subsystem 110 may subsequently apply the redirection criteria 140 to determine whether to redirect traffic 138 to the control subsystem.

The connectivity subsystem 110 redirects network traffic 126 to the control subsystem 150 in response to the redirection request 136 (step 212). Note that the control subsystem 150 may request that the network traffic 126 be redirected in any of a variety of ways. For example, the control subsystem 150 may request that only network traffic satisfying the redirection criteria 140 be redirected to the control subsystem 150 (step 220). The redirection criteria 140 act as a filter specifying which network traffic is to be redirected to the control subsystem 150. In response to such a request, the connectivity subsystem 110 may determine whether the network traffic 126 it receives satisfies the specified redirection criteria 140 (step 216), and redirect the network traffic 126 to the control subsystem 150 (step 222) only if the network traffic 138 satisfies the redirection criteria 140. Before redirecting the network traffic 126, the connectivity subsystem 110 may add to the network traffic 126 the identifier 172 of the control subsystem 150 (step 218), thereby producing network traffic 138. The connectivity subsystem 110 may transmit the modified network traffic 138, rather than the original network traffic 126, to the control subsystem 150 in step 222.

Redirection of network traffic 126 to the control subsystem 150 may be terminated in any of a variety of ways. For example, the connectivity subsystem 110 may discontinue redirection of the network traffic 126 to the control subsystem 150 (step 226). The connectivity subsystem 110 may also de-register the control subsystem 150 (step 228). De-registration may include, for example, removing the registration information 170 associated with the control subsystem 150 from the connectivity subsystem 110.

Termination of network traffic redirection may be performed in response to any of a variety of events. For example, the connectivity subsystem 110 may discontinue network traffic redirection and de-register the control subsystem 150 in response to determining that the control subsystem 150 has been removed from the system 100 or has become inoperable (step 224). Alternatively, for example, the control subsystem 150 may send a request 142 to the connectivity subsystem 110 requesting that the control subsystem 150 be de-registered. The registration subsystem 114 may de-register the control subsystem 150 in response to the de-registration request 142.

As described above, the connectivity subsystem 110 stores registration information 170 descriptive of the control subsystem 150. If, for example, the application 152*a* registers itself with the connectivity subsystem 110, then the registration information 170 may contain information about the application 152*a*.

More generally, the connectivity subsystem 110 may store information both about itself and about each of the applications registered with the connectivity subsystem in a record 160 such as a Management Information Base (MIB). For example, although FIG. 1 shows only a single registration information object 170 corresponding to the registered application 152*a*, more generally the MIB 160 may include such registration information objects for each application registered with the connectivity subsystem 110. In this way, the connectivity subsystem 110 may maintain distinct redirection criteria (i.e., traffic redirection rules) and other information for each registered application.

Figure 3:
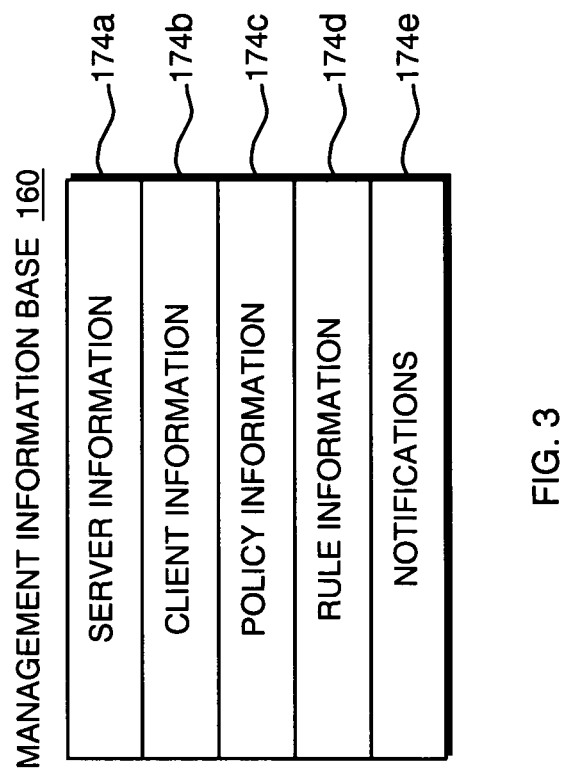
FIG. 3 is a diagram of a management information base (MIB) according to one embodiment of the present invention.

Referring to FIG. 3, a particular embodiment of the MIB 160 is shown. In the example shown in FIG. 3, the MIB includes server information 174*a*, client information 174*b*, policy information 174*c*, rule information 174*d*, and notifications 174*e*.

The server information 174*a* includes information about the connectivity subsystem 110. As will be described in more detail below, the connectivity subsystem 110 acts as a server according to a protocol that may be used by the connectivity subsystem 110 and the control subsystem 150 to communicate with each other. The server information 174*a* may include, for example, an indication of whether the connectivity subsystem 110 is a switch or a router, information about the capabilities of the connectivity subsystem 110 (such as which traffic redirection modes it supports), the maximum supported age of traffic redirection rules, and whether the connectivity subsystem 110 can store traffic redirection rules persistently.

The client information 174*b* includes information about each of the clients (e.g., applications) registered with the connectivity subsystem 110. As will be described in more detail below, the control subsystem 150 acts as a client according to a protocol that may be used by the connectivity subsystem 110 and the control subsystem 150 to communicate with each other. Each record in the client information 174*b* may include, for example, the following information about the corresponding client: the client's registration ID (e.g., the registration ID 172 in the case of application 152*a*); the hardware, operating system, and application versions of the client; the client's IP address; and the redirection mode used by the client (as specified, for example, in the redirection request 136). If the connectivity subsystem 110 allows a client to specify a distinct redirection mode for each redirection request, then the redirection mode may be stored per-redirection request rather than per-client in the client information 174*b*.

In general, the redirection criteria and the traffic redirection rules they contain are implemented using a combination of the policy information 174*c* and the rule information 174*d* in the embodiment illustrated in FIG. 3. The policy information 174*c* may include a plurality of policies. Each policy may be associated with a particular client (using a registration ID such as the registration ID 172) and have a unique policy ID to distinguish it from other policies. Each policy may include criteria for including traffic and/or excluding (filtering) traffic; a context which associates the policy with a particular redirection request; a status which indicates whether the policy is active; and a lifetime which indicates the time period during which the policy is active.

The rule information 174*d* may include a plurality of rules. Each rule may be associated with a particular client (using a registration ID such as the registration ID 172), a particular policy in the policy information 174*c*, and a unique rule ID to distinguish it from other rules. Each rule may specify an action to be performed when the rule is satisfied, such as "deny" (discard the packet without redirecting it to the control subsystem 150), "allow," and "rate" (allow no more than a specified rate of packets). Each rule may also specify criteria that a packet must satisfy to satisfy the rule, such as a particular source MAC address, destination MAC address, a VLAN ID falling within a specified ID range, use of a particular protocol, a particular source/destination IP address, a port number falling within a specified range, or any combination thereof.

In general, the notifications 174e specify which events should trigger notifications to be sent. Typically, such notifications are transmitted over the network 100 to a network management station (NMS). The notifications 174e may, for example, that notifications are to be sent upon a context (state) change in the server (connectivity subsystem 110), registration of a client with the server, de-registration of a client from the server, detection that a client has become inoperable, detection that a client has a redirection mode that is not supported by the server, detection that a rule lifetime was changed, detection that a rule has been created or deleted, or detection that a rule cannot be applied due to an error in the rule.

The registration request 132 and/or the redirection request 136 may be transmitted using a particular protocol which operates between the control subsystem 150 and the connectivity subsystem 110. This protocol will be referred to herein as the "bi-planar communication protocol." In the examples that follow, the connectivity subsystem 110 acts as a "server" and the control subsystem 150 acts as a "client" within the bi-planar communication protocol.

As one example, SNMP (Simple Network Management Protocol) may be used as the bi-planar communication protocol. As another example, a protocol layered on top of SNMP may be used as the bi-planar communication protocol. In one embodiment, "clients" (e.g., the control subsystem 150) in the bi-planar communication protocol are implemented as SNMP "managers"; and "servers" (e.g., the connectivity subsystem 110) in the bi-planar communication protocol are implemented as SNMP "agents."

Both requests 132 and 136 may, for example, be transmitted using the bi-planar communication protocol. The network traffic 138 may be redirected to the control subsystem 150 over a data path established using the bi-planar communication protocol.

The bi-planar communication protocol may provide an application program interface (API) through which the control subsystem 150 may store information, and read/modify some or all of the information, in the MIB 160, such as the redirection criteria 140. Such modifications and access may, for example, be performed using the registration request 132, redirection request 136, and/or other commands issued by the control subsystem 150 to the connectivity subsystem 110 using the bi-planar communication protocol.

The connectivity subsystem 110 may also modify information in the MIB 160 on its own initiative. For example, a lifetime may be associated with each of the rules 174d. If the lifetime associated with a redirection rule expires, the connectivity subsystem 110 may remove the rule automatically.

The bi-planar communication protocol may, for example, support sessions which are stateful and which therefore have a context that is valid for several transactions. SNMP, however, does not directly support sessions. Therefore, if the bi-planar communication protocol is implemented as a layer on top of SNMP, then sessions may be modeled. For example, the connectivity subsystem 110 may need the ability to authenticate the control subsystem 150, authorize access to policy rules, or send notification messages concerning policy rules to bi-planar communication protocol clients participating in a session. Authentication and access control may be performed on a per-message basis using an SNMPv3 security model, such as the User-based Security Model (USM), for authentication, and the View-based Access Control Model (VACM) for access control. Sending notifications to bi-planar communication protocol clients may be controlled by VACM and a mostly static configuration of objects in the MIB 160.

If the bi-planar communication protocol is implemented as a layer on top of SNMP, transactions in the bi-planar communication protocol may not map one-to-one to SNMP transactions. Examples of techniques that may be used to implement transactions in the bi-planar communication protocol using SNMP transactions will now be described.

The bi-planar communication protocol may include request-reply transactions, which contain a request message and reply message. It may not be possible to model particular ones of such transactions using one bi-planar communication protocol message per SNMP message. For example, one bi-planar communication protocol message may include a large set of parameters that does not fit into an SNMP message consisting of only a single UDP packet.

The bi-planar communication protocol may include configuration transactions, which request state changes in the server (e.g., connectivity subsystem 110). If accepted, a configuration transaction causes a state change in the server. Each configuration transaction may be modeled by one or more SNMP "set" transactions.

A bi-planar communication protocol request may be sent to the connectivity subsystem 110 by writing the parameters contained in the message to the MIB 160. The SNMP set transaction may include creating objects in the MIB 160. If not all parameters of the bi-planar communication protocol request message can be set by a single SNNMP set transaction, then more than one SNMP set transaction may be used. Completion of the final SNMP set transaction may indicate that all required parameters have been set and that processing of the bi-planar communication protocol request message may begin at the connectivity subsystem 110.

Note that a single SNMP set transaction consists of an SNMP set request message and an SNMP set reply message. Both of these messages are sent as unreliable UDP packets and may be dropped before they reach their destination. If the SNMP set request message is lost, then the SNMP manager repeats the message after receiving no reply for a specified time. Furthermore, if the SNMP set reply message is lost, the SNMP agent retransmits the SNMP set message. This time, however, the SNMP agent receives the same message twice and must make sure that it accepts the second message, as it did the first one, and that it sends an SNMP reply message again.

The control subsystem 150 and connectivity subsystem 110 may be implemented in any of a variety of ways. For example, the electronic communication network 100 may include a control plane and connectivity plane. The control plane and connectivity plane may, for example, be implemented as disclosed in the above-referenced patent applications. The control plane may include the control subsystem 150, and the connectivity plane may include the connectivity subsystem 110. The control subsystem 150 may be one of a plurality of control subsystems in the control plane.

The bi-planar communication protocol may be implemented using any of a variety of physical interfaces. In general, a "physical interface" is the set of data paths between the connectivity subsystem 110 and the control subsystem 150. If the control subsystem 150 and connectivity subsystem 110 are implemented in separate hardware devices, then the physical path is what passes the packets between the two devices. When the control subsystem 150 is implemented in a blade in a chassis, the physical path is implemented as the data path across the chassis backplane. If the control subsystem 150 is implemented as a stackable device, then the physical interface is the stack interconnect link. If the control subsystem 150 and connectivity subsystem 110 are both implemented in the same device, then the physical interface is implemented by the data bus and memory that provide inter-process (same CPU or separate CPU core) data passing.

Figure 4A:
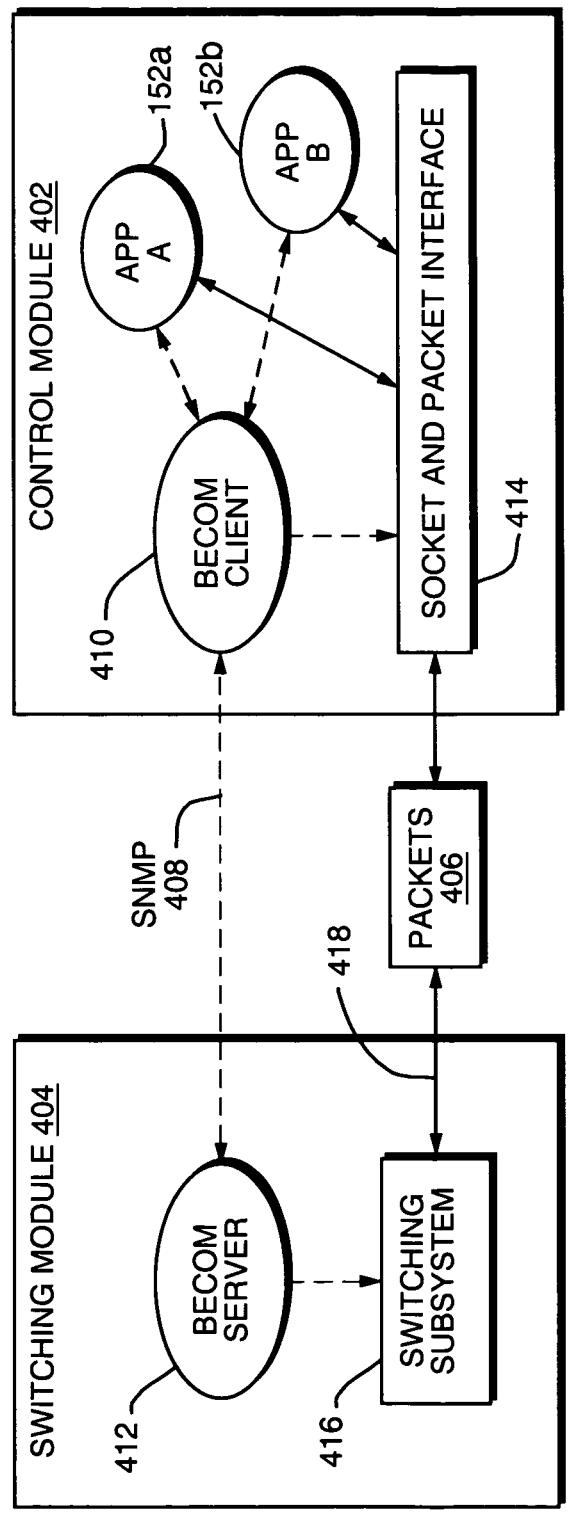
FIGS. 4A-4C are illustrations of physical configurations of a connectivity subsystem and a control system according to embodiments of the present invention.

Referring to FIG. 4A, the control subsystem 150 and connectivity subsystem 110 may be implemented in separate hardware modules 402 and 404, such as separate blades in a chassis or in separate enclosures. In the embodiment shown in FIG. 4A, the control subsystem 150 is implemented in a control hardware module 402, which hosts the network traffic control functions, and the connectivity subsystem 110 is implemented in a switching module 404, such as a router or switch.

The control hardware module 402 may, for example, connect to the switching module 404 via a backplane 406 in a chassis. Alternatively, for example, the control hardware module 402 may connect to the switching module 404 via a stack interconnect (if the control module 402 and switching module 404 are implemented as stackable devices), or via network interfaces (if the control module 402 and switching module 404 are implemented in separate enclosures).

In general, the switching module 404 provides network connectivity to receive and transmit packets 406. Traffic is directed to the control hardware module 402 by the switching module 404. More specifically, applications 152a and 152b in the control module 402 interface with a bi-planar communications protocol client 410 through software application program interfaces (APIs) to register and request traffic redirection (as described above with respect to steps 202-210 of the method 200 of FIGS. 2A-2B). The client 410 interfaces with a bi-planar communication protocol server 412 via SNMP messages 408.

Applications 152a-b receive packets 406 over a connection 418 and through a socket interface 414, such as a normal socket interface or a "raw socket" interface. A switching subsystem 416 in the switching module 404 directs packets to the control hardware module 402 after the server 412 adds bi-planar communication protocol headers to the packets 406. The dotted lines in FIG. 4A represent control flows and the solid lines represent traffic (packet) flows.

If the control module 402 is implemented in a separate enclosure, the separate enclosure may, for example, be a stackable device that connects to the switching module 404 via the stack interconnect link, or in a standalone device that connects to the switching module 404 via shared or dedicated network links. For example, the control subsystem 150 and connectivity subsystem 110 may be implemented in a plurality of stackable devices. The connectivity subsystem 110 may operate on one stackable module in the plurality of stackable devices, and the control subsystem 150 may operate on another stackable module of the stackable devices. The stackable modules may connect via a stack interconnect.

Alternatively, for example, both the control subsystem 150 and a connectivity subsystem 110 may be implemented in a single chassis device. The connectivity subsystem 110 may operate on a first hardware module of the chassis device, and the control subsystem 150 may operate on a second hardware module of the chassis device.

Figure 4B:
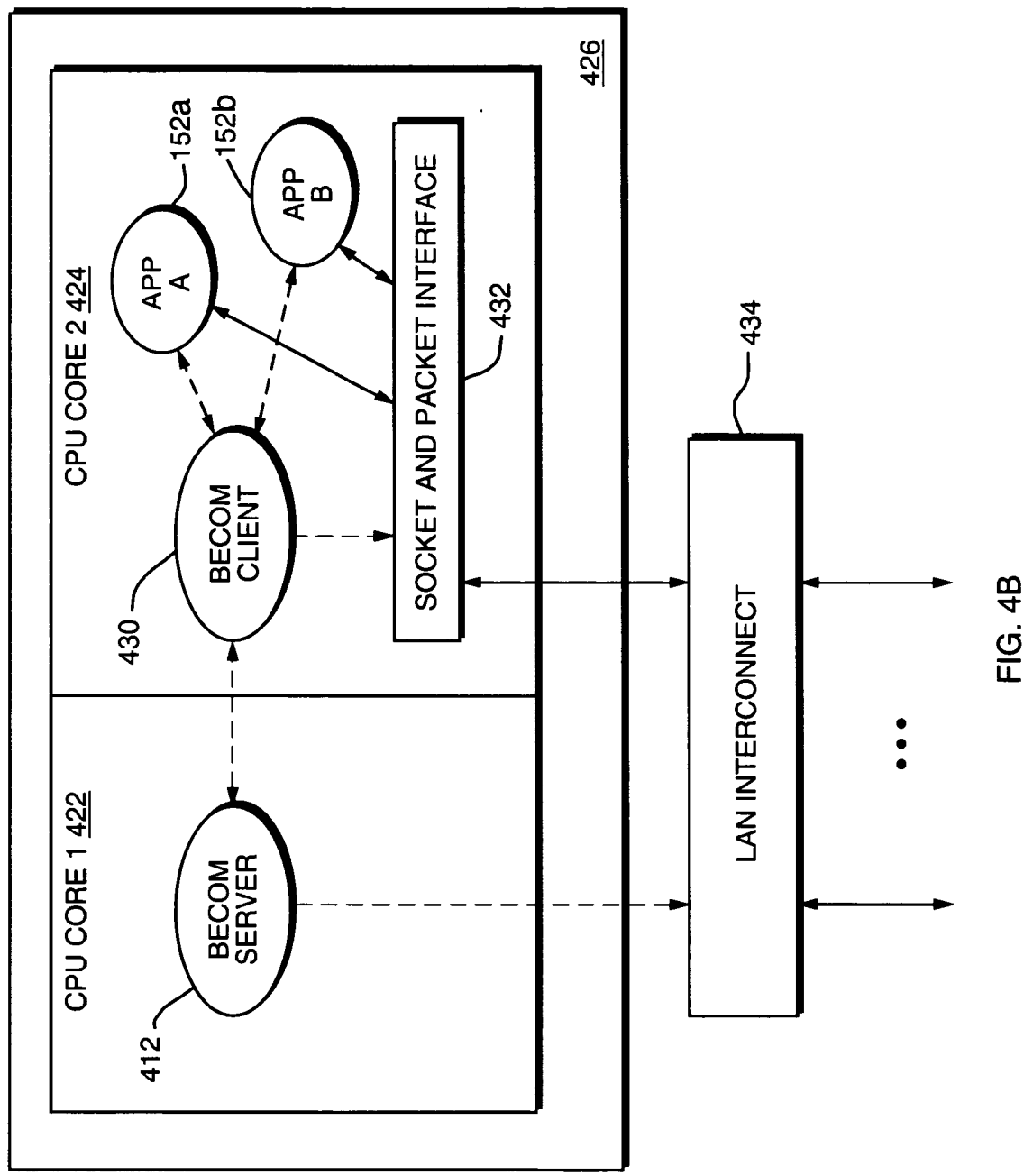

As yet another example, both the connectivity subsystem 110 and the control subsystem 150 may operate on a single hardware device, as shown in FIG. 4B. For example, the single hardware device may be a microprocessor 426 (e.g., CPU) having multiple cores 422, 424. The connectivity subsystem 110 may operate on a first one 422 of the cores and include a bi-planar communication protocol server 428. The control subsystem 150 may operate on a second one 424 of the cores and include a bi-planar communication protocol client 430, applications 152a-b, and a socket and packet interface 432.

The client 430 may connect to the server 428 via internal data paths. As with the embodiment of FIG. 4A, the server 428 provides network connectivity to receive and transmit packets. The server 428 redirects traffic received via a LAN interconnect 434 to the client 430. The embodiment shown in FIG. 4B may be particularly useful for medium-sized business gateway architectures, in which a multi-core CPU is used to run multiple applications, and in which one of the cores 422, 424 may be dedicated to implementing the control subsystem 150.

Figure 4C:
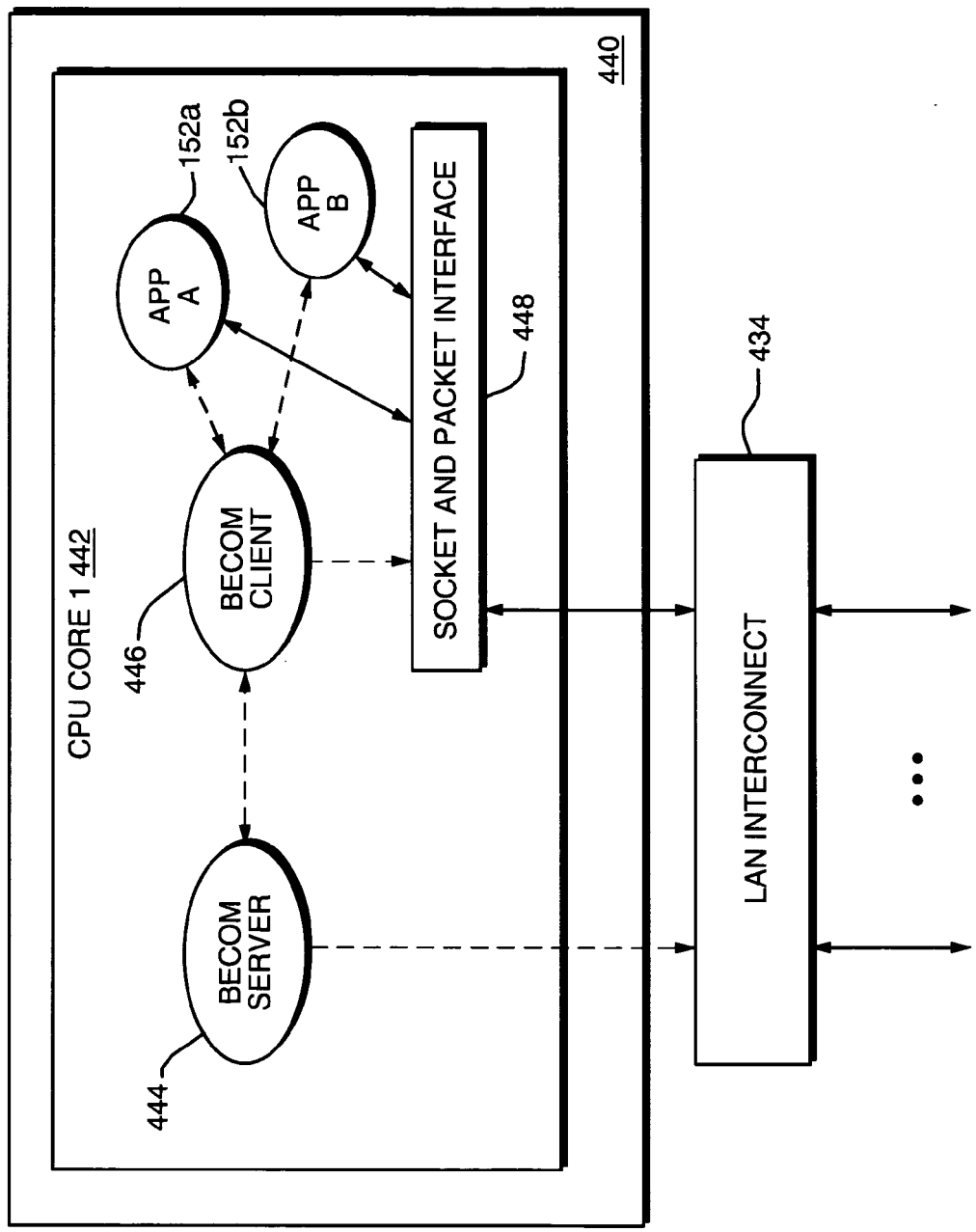

Alternatively, for example, both the connectivity subsystem 110 and the control subsystem 150 may operate on a CPU core. For example, FIG. 4C illustrates an embodiment including a single hardware device 440 including a bi-planar communication protocol server 444 (implementing the connectivity subsystem 110) and a bi-planar communication protocol client 446 (implementing the control subsystem 150). As in the embodiments of FIG. 4A-4B, the device 440 includes applications 152a-b and a socket and packet interface 448.

The server 444 and client 446 in FIG. 4C may, for example, be implemented as components of a single software image executing on the single CPU core 442. The server 444 may be implemented as one part of (e.g., one module in) the software image and the client 446 may be implemented as another part of (e.g., another module in) the software image. The embodiment shown in FIG. 4C may be particularly useful for low-end business gateways, in which only one CPU is available for all features and applications.

The connectivity subsystem 110 may redirect traffic 126 to the control subsystem 150 in any of a variety of ways. Particular modes of redirection will now be described in connection with an embodiment of the bi-planar communication protocol which is implemented as a layer on top of SNMP. In this embodiment, the connectivity subsystem 110 will be referred to as a server for purposes of the bi-planar communication protocol, and the control subsystem 150 as a client for purposes of the bi-planar communication protocol.

In one embodiment, the network traffic 126 may be redirected in a variety of modes. For example, the network traffic 126 may be redirected in an IP address mode, a copy and forward mode, or a redirect mode. The network traffic redirection request 136 may specify a particular mode in which the network traffic 126 is to be redirected. The redirection mode to be used for each application/redirection request may be reflected in the record for the application/redirection request in the MIB 160.

Figure 5A:
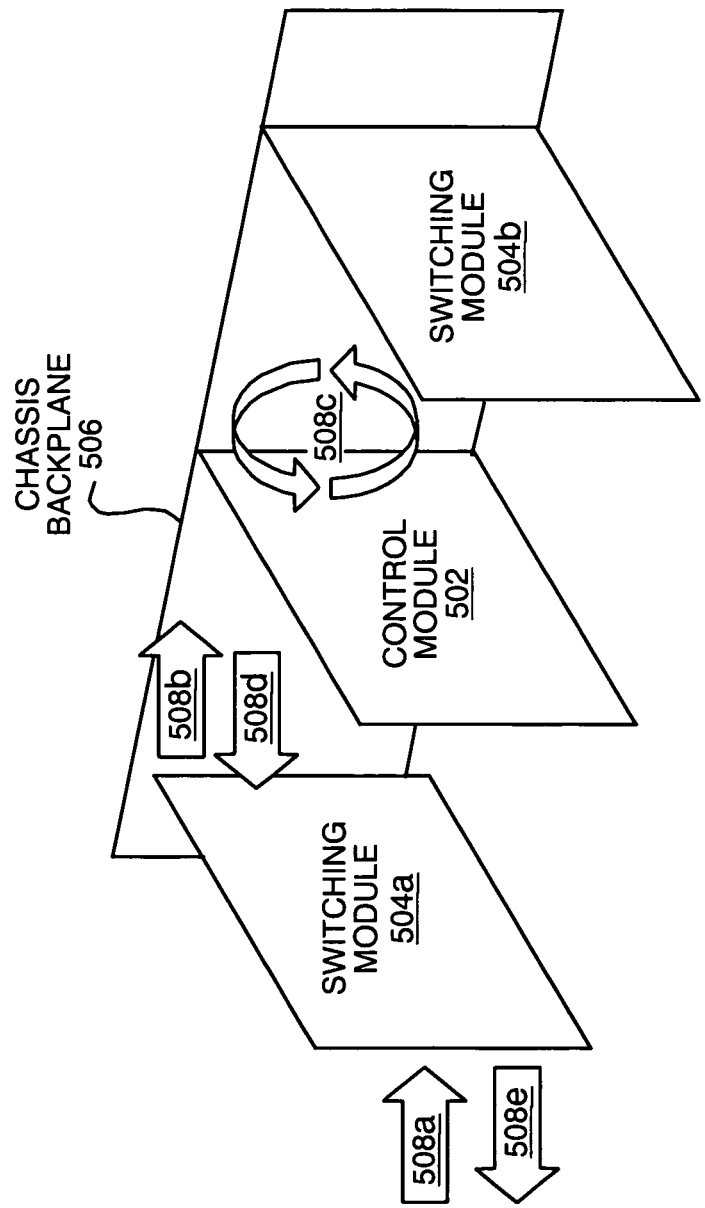
FIGS. 5A-5C are illustrations of redirecting network traffic using different redirection modes according to embodiments of the present invention.

Referring to FIG. 5A, an embodiment is shown in which the control subsystem 150 is implemented in a blade 502 in a chassis, and in which the connectivity subsystem 110 is implemented as a plurality of switch modules 504a-b. The switch modules 504a-b may, for example, be routers or switches. If switch modules 504a-b are routers, then 506 is a routing engine; if switch modules 504a-b are switches, then 506 is a switching fabric.

FIG. 5A illustrates a first redirection mode referred to herein as "IP address mode." In general, in this mode, if the destination IP address of an incoming packet matches the IP address of an application executing on the control module 502 and is not filtered out by any applicable filtering rule (step 508a), then the switching module 504a redirects the packet to the application on the control module 502 (step 508b). Note that the filtering rules may be assigned priorities and be applied in order of priority.

The packet is processed by the application executing on the control module 502 (step 508c). The application sends the packet back to switch module 504a (step 508d), which routes/switches the packet to its destination address using conventional routing/switching techniques (step 508e).

Figure 5B:
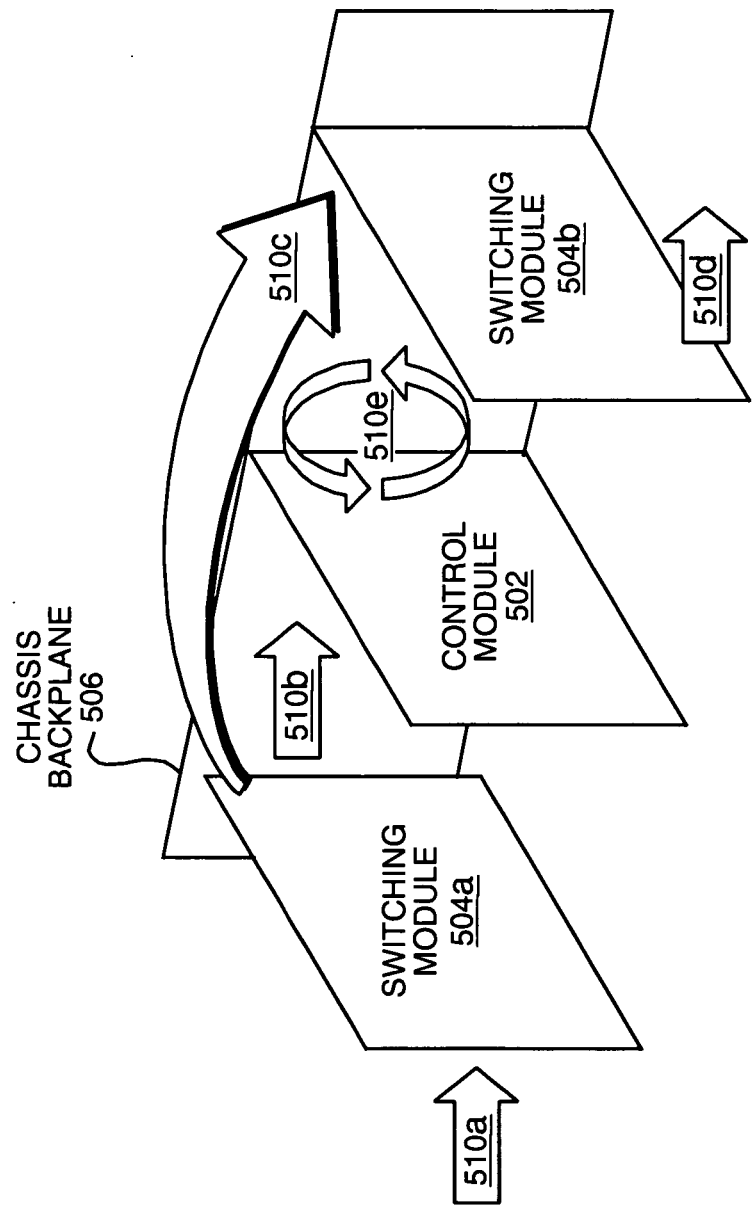

FIG. 5B illustrates an example of the copy and forward mode according to one embodiment of the present invention. In conjunction with FIG. 5B, consider an example in which the incoming packet contains an Session Initiation Protocol (SIP) "invite" message, which is used to establish a VoIP call, an incoming packet arrives at the switching module 504a (step 510a).

Assume again for purposes of example that the packet is not filtered out by any of the applicable redirection criteria. As a result, the switching module 504a copies the packet to the control module 502 (step 510b). This is the "copy" in "copy and forward," and may be used to record the VoIP call at the control module 502 (step 510e). The switch module 504a also forwards the packet to the switch module 504b (step 510c), which routes/switches the packet to its destination address (step 510d) as part of the VoIP phone call request that is established. This is the "forward" in "copy and forward."

Figure 5C:
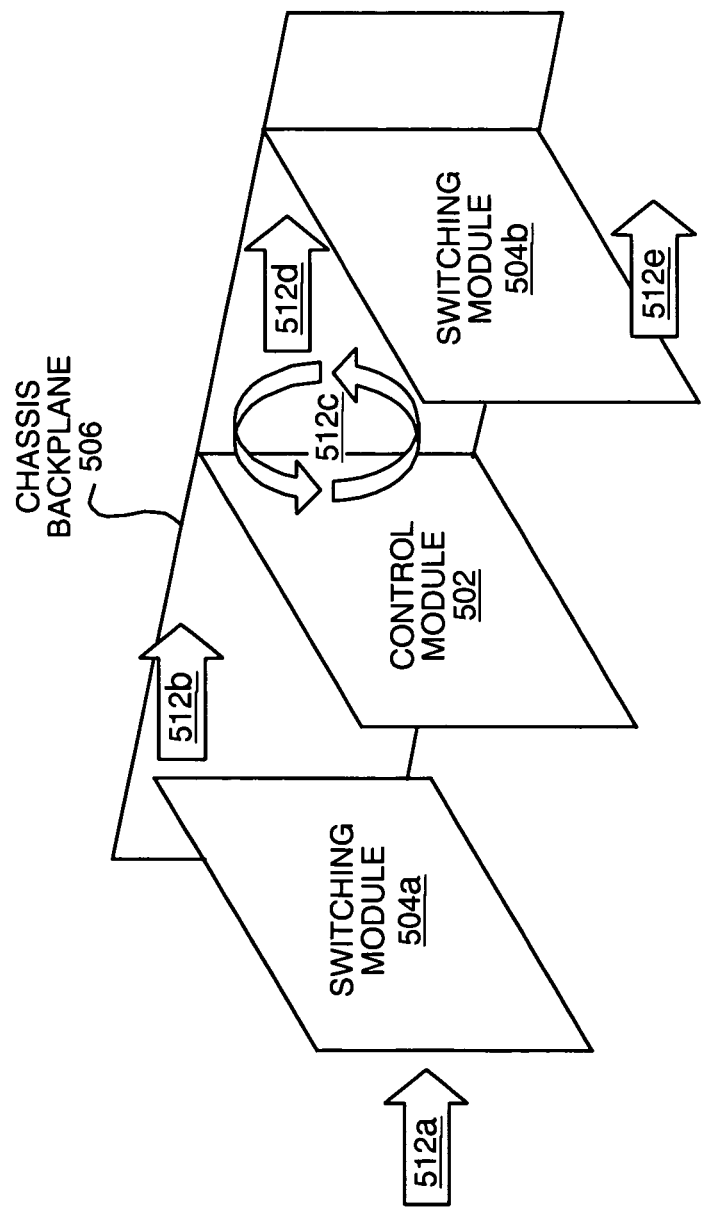

As shown in FIG. 5C, in the redirect mode, an incoming packet arrives at the switch module 504a (step 512a). Assume again for purposes of example that the packet is not filtered out by any of the applicable redirection criteria. As a result, the switch module 504a redirects the packet to the control module 502 (step 512b). The application executing on the control module 502 processes the packet and, upon determining that the packet is high priority, stamps the packet with a high priority classification (e.g., 802.1p or IPDiffServ bits) (step 512c). The packet is sent to the switch module 504b (step 512d), which forwards the packet to its intended destination (step 512e).

Among the advantages of embodiments of the invention are one or more of the following. Embodiments of the present invention facilitate deploying control subsystems in existing networks, by providing techniques for enabling the control subsystems to register themselves with existing connectivity subsystems and to request that network traffic be redirected to the control subsystems. Once traffic is redirected to the control subsystems, the control subsystems may perform network traffic control functions on the traffic, such as access control, attack control, and application control. The benefits of performing such network control functions using a control plane are described in more detail in the above-referenced patent application entitled, "Bi-Planar Network Architecture."

The techniques disclosed herein may also beneficially use the control subsystem 150 to perform functions other than control functions. For example, the techniques disclosed herein may be applied to use the control subsystem 150 to implement a VoIP soft switch, which establishes a VoIP call in response to a VoIP setup request.

Another advantage of embodiments of the present invention is that they may be implemented in a variety of physical configurations, thereby providing flexibility to implement the techniques disclosed herein in the most efficient and cost-effective manner in a particular case. For example, as described above with respect to FIGS. 4A-4C, the bi-planar communication network client and server may be implemented in separate hardware devices, in distinct cores in a multi-core processor, or in a single software image.

Yet another benefit of embodiments of the present invention is that they may be used to implement an efficient division of labor between the connectivity subsystem 110 and the control subsystem 150. For example, by segregating connectivity functions into the connectivity subsystem 110, applications 152a-c executing in the control subsystem 150 may focus more efficiently only on their intended functions (such as network access control, attack control, and application control), rather than on network connectivity functions. For example, components of the control subsystem 150 need not be designed and constructed to operate at the high speeds required of the connectivity subsystem 110. Similarly, components of the connectivity subsystem 110 may be relieved of responsibility for performing control functions.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although in certain examples the bi-planar communication protocol is described herein as being implemented as a layer on top of SNMP, this is not required. More generally, the features of the bi-planar communication protocol disclosed herein are merely examples and do not constitute limitations of the present invention. Any protocol may be used which provides the ability to perform the registration and traffic redirection functions described herein.

The particular contents and structure of the Management Information Base (MIB) 160 described herein are provided merely for purposes of example and do not constitute limitations of the present invention. Any of a variety of data structures which provide information about the connectivity subsystem 110, control subsystem 150, registration, and traffic redirection may be used to perform the functions described herein for the MIB 160.

Although the control subsystem 150 and connectivity subsystem 110 may be implemented using the techniques disclosed in the above-referenced patent application entitled, "Bi-Planar Network Architecture," this is not a requirement of the present invention. Rather, the control subsystem 150 and connectivity subsystem 110 may be implemented in any appropriate manner.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method comprising:
   receiving, in a connectivity subsystem, a registration request from a control subsystem;
   sending, by the connectivity subsystem, a registration confirmation message to the control subsystem, wherein the registration confirmation message includes information related to capabilities of the connectivity subsystem;
   receiving a redirection request requesting that network traffic be redirected from the connectivity subsystem to the control subsystem; and
   redirecting network traffic from the connectivity subsystem to the control subsystem in response to the redirection request.

2. The method of claim 1, further comprising:
   assigning a registration identifier to the control subsystem.

3. The method of claim 1, further comprising:
   confirming the network traffic redirection request.

4. The method of claim 3, wherein confirming the network traffic redirection request comprises sending a redirection confirmation message from the connectivity subsystem to the control subsystem.

5. The method of claim 1, wherein redirecting network traffic from the connectivity subsystem to the control subsystem comprises:
   receiving the network traffic; and
   sending the network traffic to the control subsystem.

6. The method of claim 5, wherein redirecting network traffic from the connectivity subsystem to the control subsystem further comprises:
   adding to the received network traffic an identifier that identifies the traffic redirection request.

7. The method of claim 1, wherein receiving the redirection request comprises receiving a redirection request requesting that network traffic satisfying redirection criteria be redirected to the control subsystem; and
   wherein redirecting network traffic from the connectivity subsystem to the control subsystem comprises:
   determining whether the network traffic satisfies the redirection criteria; and
   redirecting the network traffic to the control subsystem if the network traffic is determined to satisfy the redirection criteria.

8. The method of claim 7, wherein receiving the redirection request comprises receiving the redirection request requesting that the network traffic be redirected in one of an IP address mode, a copy and forward mode, and a redirect mode.

9. The method of claim 1, further comprising:
   storing registration information about the control subsystem in a Management Information Base (MIB).

10. The method of claim 9, further comprising:
    determining that the control subsystem has become inoperable;
    discontinuing redirection of the network traffic to the control subsystem; and
    de-registering the control subsystem.

11. The method of claim 1, further comprising:
    receiving a registration request message from the control subsystem using a protocol which operates between the control subsystem and the connectivity subsystem;
    receive the redirection request using the protocol; and
    redirecting the network traffic to the control subsystem over a data path.

12. The method of claim 1, wherein the control subsystem is part of a control plane.

13. The method of claim 12, wherein the control plane comprises a plurality of control subsystems.

14. An electronic communication network comprising:
    a connectivity subsystem,
    wherein the connectivity subsystem is to:
    receive a registration request from a control subsystem,
    send a registration confirmation message to the control subsystem, wherein the registration confirmation message includes information related to capabilities of the connectivity subsystem,
    receive a redirection request from the control subsystem,
    confirm the redirection request, and
    redirect network traffic to the control subsystem in response to the redirection request.

15. The electronic communication network of claim 14, wherein the connectivity subsystem is further to register the control subsystem with the connectivity subsystem in response to the registration request.

16. The electronic communication network of claim 15, wherein the connectivity subsystem is further to store registration information about the control subsystem in a data store.

17. The electronic communication network of claim 14, wherein the connectivity subsystem is to receive the network traffic and send the network traffic to the control subsystem.

18. The electronic communication network of claim 14, wherein the connectivity subsystem is to add to the network traffic an identifier that identifies the redirection request.

19. The electronic communication network of claim 14, wherein the redirection request requests that network traffic satisfying redirection criteria be redirected to the control subsystem; and
    wherein the connectivity subsystem is to determine whether the network traffic satisfies the redirection criteria and to redirect the network traffic to the control subsystem if the network traffic is determined to satisfy the redirection criteria.

20. The electronic communication network of claim 14, wherein the redirection request requests that the network traffic be redirected in one of an IP address mode, a copy and forward mode, and a redirect mode.

21. The electronic communication network of claim 14, wherein the connectivity subsystem is to:
    receive the registration request using a protocol which operates between the control subsystem and the connectivity subsystem,
    receive the redirection request using the protocol, and redirect the network traffic to the control subsystem over a data path.

22. The electronic communication network of claim 14, wherein the connectivity subsystem is to assign a registration identifier to the control subsystem.

23. The electronic communication network of claim 14, wherein the connectivity subsystem is to send a redirection confirmation message to the control subsystem.

24. The electronic communication network of claim 14, wherein the connectivity subsystem is to receive the registration request using SNMP, and receive the redirection request using SNMP.

25. The electronic communication network of claim 14, wherein the electronic communication network comprises a control plane including the control subsystem.

26. The electronic communication network of claim 25, wherein the control plane comprises a plurality of control subsystems.

27. The network of claim 14, wherein the connectivity subsystem operates on a first hardware module of a chassis device, and wherein the control subsystem operates on a second hardware module of the chassis device.

28. The network of claim 14, wherein the connectivity subsystem operates on one stackable module in a plurality of stackable devices, and wherein the control subsystem operates on another stackable module of the plurality of stackable devices.

29. The network of claim 14, wherein the connectivity subsystem operates on one standalone hardware device, and wherein the control subsystem operates on another standalone hardware device.

30. The network of claim 14, wherein both the connectivity subsystem and the control subsystem operate on a single hardware device.

31. The network of claim 30, wherein the connectivity subsystem operates on one CPU core of the single hardware device and wherein the control subsystem operates on another CPU core of the hardware device.

32. The network of claim 30, wherein both the connectivity subsystem and the control subsystem operate on a single CPU core of the hardware device.

33. A connectivity subsystem for use with an electronic communication network, the electronic communication network including a control subsystem, the connectivity subsystem comprising:
a memory storing machine readable instructions to:
receive a registration request from the control subsystem to register the control subsystem with the connectivity subsystem;
register the control subsystem with the connectivity subsystem in response to the registration request;
send a registration confirmation message to the control subsystem, wherein the registration confirmation message includes information related to capabilities of the connectivity subsystem;
receive a redirection request from the control subsystem to redirect network traffic from the connectivity subsystem to the control subsystem; and
redirect the network traffic to the control subsystem in response to the redirection request; and
a processor to implement the machine readable instructions.

34. The connectivity subsystem of claim 33, the machine readable instructions are further to store registration information about the control subsystem in a data store.

35. The connectivity subsystem of claim 33, wherein the machine readable instructions are further to receive the network traffic and send the network traffic to the control subsystem.

36. The connectivity subsystem of claim 35, wherein the the machine readable instructions are further to add to the network traffic an identifier that identifies the redirection request.

37. The connectivity subsystem of claim 35, wherein the redirection request includes redirection criteria; and
wherein the machine readable instructions are further to determine whether the network traffic satisfies the redirection criteria and send the network traffic to the control subsystem if the network traffic is determined to satisfy the redirection criteria.

38. The connectivity subsystem of claim 37, wherein the redirection request requests that the network traffic be redirected in one of an IP address mode, a copy and forward mode, and a redirect mode.

39. The connectivity subsystem of claim 33, wherein the machine readable instructions are to receive the registration request using a protocol which operates between the control subsystem and the connectivity subsystem, receive the redirection request using the protocol, and redirect the network traffic to the control subsystem over a data path.

40. The connectivity subsystem of claim 33, wherein the machine readable instructions are further to assign a registration identifier to the control subsystem.

41. The connectivity subsystem of claim 33, wherein the machine readable instructions are further to send a redirection confirmation message to the control subsystem.

42. The connectivity subsystem of claim 33, wherein the machine readable instructions are to receive the registration request using SNMP, and receive the redirection request using SNMP.

43. The connectivity subsystem of claim 33, wherein the connectivity subsystem operates on a first hardware module of a chassis device, and wherein the control subsystem operates on a second hardware module of the chassis device.

44. The connectivity subsystem of claim 33, wherein the connectivity subsystem operates on one stackable module in a plurality of stackable devices, and wherein the control subsystem operates on another stackable module of the plurality of stackable devices.

45. The connectivity subsystem of claim 33, wherein the connectivity subsystem operates on one standalone hardware device, and wherein the control subsystem operates on another standalone hardware device.

46. The connectivity subsystem of claim 33, wherein both the connectivity subsystem and the control subsystem operate on a single hardware device.

47. The connectivity subsystem of claim 46, wherein the connectivity subsystem operates on one CPU core of the single hardware device and wherein the control subsystem operates on another CPU core of the hardware device.

48. The connectivity subsystem of claim 46, wherein both the connectivity subsystem and the control subsystem operate on a single CPU core of the hardware device.

49. A control subsystem for use with an electronic communication network, the electronic communication network including a connectivity subsystem, the control subsystem comprising:
a memory storing machine readable instructions to:
send a registration request to the connectivity subsystem to request that the control subsystem be registered with the connectivity subsystem;

receive a registration confirmation message from the connectivity subsystem, wherein the registration confirmation message includes information related to capabilities of the connectivity subsystem; and send a redirection request requesting that network traffic be redirected from the connectivity subsystem to the control subsystem; and a processor to implement the machine readable instructions.

50. The control subsystem of claim 49, wherein the machine readable instructions are further to:

receive the redirected network traffic from the connectivity subsystem.

51. The control subsystem of claim 49, wherein the machine readable instructions are to request that network traffic satisfying redirection criteria be redirected to the control subsystem.

52. The control subsystem of claim 49, wherein the machine readable instructions are to request that the network traffic be redirected in one of an IP address mode, a copy and forward mode, and a redirect mode.

53. The control subsystem of claim 49, wherein the machine readable instructions are to send the registration request using a protocol which operates between the control subsystem and the connectivity subsystem; and wherein the machine readable instructions are to send the redirection request using the protocol.

54. The control subsystem of claim 53, wherein the protocol comprises SNMP.

55. The control subsystem of claim 49, wherein the connectivity subsystem operates on a first hardware module of a chassis device, and wherein the control subsystem operates on a second hardware module of the chassis device.

56. The control subsystem of claim 49, wherein the connectivity subsystem operates on one stackable module in a plurality of stackable devices, and wherein the control subsystem operates on another stackable module of the plurality of stackable devices.

57. The control subsystem of claim 49, wherein the connectivity subsystem operates on one standalone hardware device, and wherein the control subsystem operates on another standalone hardware device.

58. The control subsystem of claim 49, wherein both the connectivity subsystem and the control subsystem operate on a single hardware device.

59. The control subsystem of claim 58, wherein the connectivity subsystem operates on one microprocessor core of the single hardware device and wherein the control subsystem operates on another microprocessor core of the hardware device.

60. The control subsystem of claim 58, wherein the single hardware device comprises a microprocessor core, wherein the connectivity subsystem operates on the microprocessor core, and wherein the control subsystem operates on the microprocessor core.

61. A non-transitory computer-readable medium tangibly embodying processor-executable computer program code, which when executed causes a connectivity subsystem to:

register a control subsystem the connectivity subsystem in an electronic communication network;

send a registration confirmation message to the control subsystem, wherein the registration confirmation message includes information related to capabilities of the connectivity subsystem;

redirect network traffic from the connectivity subsystem to the control subsystem in response to a redirection request from the control subsystem; and determine which network traffic to redirect to the control subsystem.

62. The non-transitory computer-readable medium of claim 61, wherein the registration confirmation message further comprises a registration identifier associated with the control subsystem.

63. The non-transitory computer-readable medium of claim 61, wherein the computer program code further causes the connectivity subsystem to redirect the network traffic from the connectivity subsystem to the control subsystem in a redirection mode, wherein the redirect mode is one of an IP address mode, a copy and forward mode, and a redirect mode.

64. A non-transitory computer-readable medium storing computer program instructions to:

carry a registration request from a control subsystem to a connectivity subsystem;

carry a registration confirmation message from the connectivity subsystem to the control subsystem, wherein the registration confirmation message includes information related to capabilities of the connectivity subsystem;

carry a traffic redirection request from the control subsystem to the connectivity subsystem; and carry redirected traffic from the connectivity subsystem to the control subsystem.

* * * * *